United States Patent [19]

Doubovetzky et al.

[11] 4,073,806
[45] Feb. 14, 1978

[54] PROCESS FOR THE PREPARATION OF PHOSGENE

[75] Inventors: Serge Doubovetzky; Peter Forschner, both of Toulouse; Francois Montazeau, Portet sur Garonne, all of France

[73] Assignee: Societe Toulousaine de Produits Chimiques "Tolochimie", Courbevoie, France

[21] Appl. No.: 645,938

[22] Filed: Dec. 31, 1975

[30] Foreign Application Priority Data

Jan. 8, 1975    France ............................... 75.01201

[51] Int. Cl.² ........................................... C07C 51/58
[52] U.S. Cl. ................................................ 260/544 K
[58] Field of Search ................................... 260/544 K

[56] References Cited

U.S. PATENT DOCUMENTS

| 1,457,493 | 6/1923 | Bradner | 260/544 K |
| 3,331,873 | 7/1967 | DeLong et al. | 260/544 K |
| 3,515,752 | 6/1970 | Bauer | 260/544 K |

FOREIGN PATENT DOCUMENTS

| 2,109,186 | 5/1972 | France | 260/544 K |
| 583,477 | 12/1946 | United Kingdom | 260/544 K |

Primary Examiner—Norman Morgenstern
Attorney, Agent, or Firm—Bacon & Thomas

[57]     ABSTRACT

Phosgene is prepared from chlorine and carbon monoxide by plural stage catalytic interreaction wherein all of the chlorine requirement and at least some but less than all of the carbon monoxide requirement is introduced to a first stage reaction zone, with the remaining required carbon monoxide being introduced to downstream reaction zone(s) serially connected to said first stage reaction zone.

13 Claims, No Drawings

PROCESS FOR THE PREPARATION OF PHOSGENE

BACKGROUND OF THE INVENTION

1. Field of the Invention

The present invention relates to a process for the preparation of phosgene from chlorine and carbon monoxide, and, more especially, to the preparation of phosgene from chlorine and carbon monoxide by catalytic reaction therebetween in at least two stages.

2. Description of the Prior Art

Phosgene is a known, very important intermediate for a variety of chemical syntheses, especially in the chemistry of the polyurethanes, because it permits the manufacture of isocyanates from the corresponding amines.

The methods for the preparation of phosgene most frequently and typically employed consist of interreacting a mixture of chlorine and carbon monoxide. Such reaction can be carried out by the UV radiation or $\gamma$-radiation, but industrially it is generally conducted in the vapor phase by passing a stream of chlorine and carbon monoxide over elemental carbon, for example, in the form of active charcoal.

Under these conditions, one of the principal problems presented by this method of manufacture is the removal of the heat evolved due to the great exothermicity of the reaction.

Conventional solutions to this type of problem typically consist of diluting the reaction gases either with a gas which is inert to the reaction or with tail gases from which the desired product has been removed. These two techniques each present additional disadvantages. In effect, the inert gas is lost, which increases the cost of the process, and the recycling of the tail gases requires the use of rotating machinery, the operation of which is always a delicate problem and hazardous when the products handled are as dangerous as carbon monoxide or phosgene.

In French patent application Ser. No. 75/01200, filed Jan. 8, 1975, assigned to the assignee hereof, there is described a process for the preparation of phosgene which consists of introducing the reactant chlorine in several stages. Undoubtedly this technique has permitted better control of the reaction, but the productivity of such facilities still is lacking.

And while consideration might be accorded the eventuality of introducing the carbon monoxide in a plurality of stages, the state of the art would appear to point in the opposite direction. In fact, as best as can be determined, the art is apparently unequivocal in its direction that the reaction should be carried out in the presence of an excess of carbon monoxide [compare French Patent No. 2,109,186 or *C.A.*, 74, 66,194 *a*]

Thus, there remains a need in the art for a simple and inexpensive, yet highly efficient procedure for the preparation of phosgene from chlorine and carbon monoxide gases.

SUMMARY OF THE INVENTION

Accordingly, it is a primary object of the present invention to provide an improved process for the preparation of phosgene from chlorine and carbon monoxide.

Another object of the invention is to provide an improved process for the preparation of phosgene from chlorine and carbon monoxide by plural stage catalytic interreaction.

Yet another object of the invention is to provide an improved plural stage catalytic process for the preparation of phosgene from chlorine and carbon monoxide wherein the chlorine requirement and at least some but less than all of the carbon monoxide requirement is introduced to a first stage reaction zone, with the remaining required carbon monoxide being introduced to downstream reaction zone(s) serially communicating with said first stage reaction zone.

Other objects, features and advantages of the invention will become more apparent from the description which follows.

DETAILED DESCRIPTION OF THE INVENTION

It has now surprisingly been found that, in contradistinction to the direction seemingly pointed to by the prior art, phosgene can simply, inexpensively and efficiently be prepared from chlorine and carbon monoxide gases, by successively introducing the CO requirement to each of a series of discrete reaction zones, thus providing a stoichiometric excess of chlorine vis-a-vis carbon monoxide in the initial reactor(s) or stage(s) of reaction, and which process exhibits those important advantages as will hereinafter more fully be seen.

More particularly according to the invention, phosgene is prepared by vapor phase reaction between chlorine and carbon monoxide at a temperature of between about 50° and 400° C., under an absolute pressure of between about 1 and 10 bars, in the presence of carbon, and further characterized in that the reaction is carried out by passing the reactants over at least two successive catalyst beds connected in series, the chlorine being introduced to the first bed and portion but less than all of the total carbon monoxide required being introduced to each bed, with the molar ratio ratio of total carbon monoxide to total chlorine being greater than 0.95. In the first stage reaction zone the molar ratio of chlorine to carbon monoxide is greater than 1 and is generally between 1.2 and 5.

While usually the molar ratio of the total amount of carbon monoxide to the total amount of chlorine is generally greater than 1 (the carbon monoxide is present in stoichiometric excess), such condition is in this case only attained in the last reactor.

Industrial grade chlorine is perfectly satisfactory for conducting the process according to the invention. Similarly, the carbon monoxide can contain up to 5 % by volume of carbon dioxide. However, the purer the carbon monoxide, the easier it is to separate the reaction products. All of the chlorine is usually introduced in the first stage reaction zone. But the chlorine may be eventually introduced to each bed. In this latter case the molar ratio of chlorine to carbon monoxide in the first stage reaction zone is always greater than 1.

The molar ratio of total carbon monoxide to chlorine must be greater than 0.95. If same is between 0.95 and 1, means for separating the excess chlorine from the phosgene obtained are advantageously provided. For example, this separation can readily be effected by simple distillation. Preferably, the molar ratio is between 1.0 and 1.10. It has also been found that in the latter case, facility operating conditions are the simplest, particularly as regards the removal of the excess carbon monoxide, which removal is easily achieved by simply condensing the phosgene. If the molar ratio is greater than 1.10, complex apparatus requirements for the recovery of the excess carbon monoxide must be employed, and which add to the investment and operating costs of the system without concomitant major advantage being achieved.

The carbon, in the presence of which the reaction is carried out, is preferably selected to be in particle form or granular. In any event, the geometrical and mechanical properties of this material do not entail any difficulties in the use thereof. In practice, active charcoal having a specific surface area in the order of 1,000 m$^2$/g and having a particle size between 0.4 and 5 mm is preferred. However, it should be noted that the noted conditions respecting the charcoal are not critical.

According to an especially advantageous method of carrying out the process according to the invention, the catalyst can be diluted with an inert filler such as graphite.

The temperature within the catalyst mass is desirably between 50° and 400° C. However, these figures represent outer limits and on the average the temperature of the reaction zone is usually between 250° and 350° C. It too has been found, and this is one of the prime advantages of the subject process, that the presence of a large excess of chlorine in the first reactor or reactors favored the spread of the reaction zone, thus tending to keep down the maximum temperature of the catalyst mass. The extent to which the maximum temperature is kept at a minimum is much greater than that observed in the case where the chlorine is introduced in multiple stages. In fact, it appears that the mechanisms of adsorption, condensation and desorption of the gases on the catalyst are such that excess chlorine is very advantageous for the conduct of the reaction. It similarly has been found that the productivity of such facilities is high, the catalyst life is longer and side reactions are minimized.

The absolute pressure within the reactors is preferably between 1 and 10 bars, most preferably between 3 and 7 bars. Below atmospheric pressure, the productivity is diminished and, furthermore, the condensation of the phosgene becomes difficult. Above 10 bars, the advantages of the effect of pressure on the chemistry of the reaction are offset by the enhanced cost of equipment which is resistant to such pressure. According to another embodiment of the invention, the pressure in the different reactors need not be the same. However, it always remains between 1 and 10 bars.

While any one or more of the typical reactors or apparatus may be employed, tubular reactors are greatly preferred. A particularly advantageous practical embodiment consists of using a tube bundle cooled by a liquid coolent such as water or carbon tetrachloride.

According to another embodiment of the invention, in cases where the overall molar ratio of total carbon monoxide to chlorine is greater than 1, and where it is desired to obtain a particularly pure phosgene, especially with a chlorine content of less than 200 ppm, it is useful to pass the reaction gases, downstream of the actual reactor train, through one or more finishers or reaction terminators.

In order to further illustrate the present invention and the advantages thereof, the following specific example is given, it being understood that same is intended merely as illustrative and in nowise limitative.

EXAMPLE

Two single-tube reactors 27 mm in diameter, mounted in series, were each charged to a height of 1.05 m with active charcoal [the charcoal being produced from coconut and having a specific surface area of 1,200 m$^2$/g, a particle size of 1.25–3 mm and an apparent density of 0.5].

3.580 kg/hour of chlorine and 0.744 kg/hour of carbon monoxide were introduced into the first reactor, and 0.744 kg/hour of carbon monoxide were introduced into the phosgene/chlorine mixture which enters the second reactor [overall molar ratio of total carbon monoxide to chlorine = 1.05].

The operating pressure was 5 bars and cooling was provided by a double jacket through which water circulated.

Upon exiting the second reactor, the gaseous mixture was passed into a finisher 80 mm in diameter charged with active charcoal to a height of 1 m.

Downstream of the finisher, the mixture was passed through a brine-fed condenser which made it possible to recover phosgene containing less than 200 ppm of chlorine.

Over an operating period of 288 hours, the pilot unit produced 1,440 kg of phosgene, corresponding to 5 kg/hour (99% yield); the maximum temperature observed in the reactor was 350° C. and the average temperature was 290° C.

While there have been described and pointed out the fundamental novel features of the invention as applied to the preferred embodiment, those skilled in the art will appreciate that various modifications, changes, and omissions in the process for the preparation of phosgene described and illustrated can be made without departing from the spirit of the invention. It is the intention, therefore, to be limited only by the scope of the claims which follow. What is claimed is:

1. A process for the preparation of phosgene which comprises catalytically interreacting chlorine and carbon monoxide gases in plural stages wherein the chlorine requirement and at least some but less than all of the carbon monoxide requirement is introduced to a first stage reaction zone, with the remaining required carbon monoxide being introduced to at least one downstream reaction zone, said at least one downstream reaction zone being in serial communicating relationship with said first stage reaction zone.

2. The process as defined by claim 1, wherein the temperature of reaction is between about 50° and 400° C., the absolute pressure of reaction is between about 1 and 10 bars, and the reaction is conducted in the presence of a carbon catalyst.

3. The process as defined by claim 2, wherein the molar ratio of total carbon monoxide to total chlorine is greater than 0.95.

4. The process as defined by claim 2, wherein the molar ratio of total carbon monoxide to total chlorine is between 0.95 and 1.0.

5. The process as defined by claim 2, wherein the molar ratio of total carbon monoxide to total chlorine is between 1.0 and 1.10.

6. The process as defined by claim 1, wherein the temperature of reaction is between about 250° and 350° C.

7. The process as defined by claim 1, wherein the absolute pressure of reaction is between about 3 and 7 bars.

8. The process as defined by claim 1, wherein the reaction is conducted in a two stage reaction zone.

9. The process as defined by claim 2, wherein the carbon catalyst comprises activated charcoal.

10. The process as defined in claim 1, further including a finisher or reaction terminator reaction zone.

11. The process as defined by claim 1 wherein all of the chlorine requirement is introduced to the first stage reaction zone.

12. The process as defined by claim 1 wherein the molar ratio of chlorine to carbon monoxide in the first stage reaction zone is greater than 1.

13. The process as defined by claim 12 wherein the said molar ratio is between 1.2 and 5.

* * * * *